United States Patent
Wu et al.

(10) Patent No.: US 11,487,162 B2
(45) Date of Patent: Nov. 1, 2022

(54) DISPLAY PANEL, MANUFACTURING METHOD THEREOF, AND TRANSFER PRINTING DEVICE

(71) Applicant: WUHAN CHINA STAR OPTOELECTRONICS TECHNOLOGY CO., LTD., Wuhan (CN)

(72) Inventors: Yunfei Wu, Wuhan (CN); Fan Lin, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 219 days.

(21) Appl. No.: 16/955,126

(22) PCT Filed: Mar. 27, 2020

(86) PCT No.: PCT/CN2020/081593
§ 371 (c)(1),
(2) Date: Jun. 18, 2020

(87) PCT Pub. No.: WO2021/168966
PCT Pub. Date: Sep. 2, 2021

(65) Prior Publication Data
US 2022/0137465 A1 May 5, 2022

(30) Foreign Application Priority Data
Feb. 27, 2020 (CN) .......................... 202010126072.6

(51) Int. Cl.
*G02F 1/13* (2006.01)
*G02F 1/1337* (2006.01)
(Continued)

(52) U.S. Cl.
CPC .......... *G02F 1/133788* (2013.01); *B41F 3/46* (2013.01); *B41F 16/00* (2013.01);
(Continued)

(58) Field of Classification Search
CPC ........... G02F 1/133788; G02F 1/13378; G02F 1/1303; B41F 3/46; B41F 16/00; C09K 2323/00; C09K 2323/02
(Continued)

(56) References Cited

U.S. PATENT DOCUMENTS

2003/0093172 A1 5/2003 Lee
2004/0038010 A1 2/2004 Kim et al.
(Continued)

FOREIGN PATENT DOCUMENTS

| CN | 1378917 A | 11/2002 |
|---|---|---|
| CN | 1495491 A | 5/2004 |

(Continued)

*Primary Examiner* — Ruiyun Zhang
(74) *Attorney, Agent, or Firm* — Amster, Rothstein & Ebenstein LLP

(57) ABSTRACT

The present disclosure provides a display panel, a manufacturing method thereof, and a transfer printing device. In the embodiments of the present disclosure, at least one groove is defined in a transfer printing plate of the transfer printing device, through holes corresponding to blind holes can be formed in an area corresponding to the grooves, thereby preventing blocking effect of an original alignment film on light passing through the blind holes, increasing light transmittance of the blind holes, and improving an overall performance of devices with the blind holes.

7 Claims, 2 Drawing Sheets

(51) Int. Cl.
*B41F 3/46* (2006.01)
*B41F 16/00* (2006.01)
(52) U.S. Cl.
CPC ........ *G02F 1/1303* (2013.01); *C09K 2323/00* (2020.08); *C09K 2323/02* (2020.08)
(58) Field of Classification Search
USPC ............................ 428/1.1, 1.2, 137; 349/123
See application file for complete search history.

(56) References Cited

U.S. PATENT DOCUMENTS

2005/0126410 A1\* 6/2005 Won .......................... B41F 3/06
101/359
2016/0320645 A1 11/2016 Kim

FOREIGN PATENT DOCUMENTS

| | | |
|---|---|---|
| CN | 102375268 A | 3/2012 |
| CN | 104849914 A | 8/2015 |
| CN | 108008578 A | 5/2018 |
| CN | 110068961 A | 7/2019 |
| JP | 2000075298 A | 3/2000 |

\* cited by examiner

DISPLAY PANEL, MANUFACTURING METHOD THEREOF, AND TRANSFER PRINTING DEVICE

FIELD OF INVENTION

The present disclosure relates to the field of display technologies, and particularly relates to a display panel, a manufacturing method thereof, and a transfer printing device.

BACKGROUND OF INVENTION

With development of communication technology, electronic products such as smart phones are becoming more and more popular. With popularization of a concept of full screen, present smartphone market is becoming increasingly homogenous following a trend of internationally renowned terminal manufacturers. In a wave of pursuit of full screen, full screens and water drop screens have become focuses of major terminal manufacturers, and mobile phone products further become more uniform.

Technical Problems

However, due to a lack of technology, transmittance of blind holes in the screens still has great defects.

Technical Solutions

Embodiments of the present disclosure provides a display panel, a manufacturing method thereof, and a transfer printing device. At least one groove is defined in a transfer printing plate of the transfer printing device, so during coating of an alignment liquid, the transfer printing plate of the transfer printing device effectively prevents the alignment liquid from being coated in the groove. Therefore, when coating the alignment liquid to a substrate by using the transfer printing plate of the transfer printing device, through holes corresponding to blind holes can be formed in an area corresponding to the grooves, thereby preventing blocking effect of an original alignment film on light passing through the blind holes, increasing light transmittance of the blind holes, and improving an overall performance of devices with the blind holes.

In a first aspect, an embodiment of the present disclosure provides a transfer printing device. The transfer printing device includes a plate cylinder and a transfer printing plate disposed on a side wall of the plate cylinder. At least one groove is defined in the transfer printing plate.

In some embodiments, at least two grooves are defined in the transfer printing plate.

In some embodiments, the groove is shaped as a circle or a regular polygon.

In a second aspect, an embodiment of the present disclosure provides a manufacturing method of a display panel including steps as follows:

preparing a functional layer, wherein blind holes are defined in the functional layer;

preparing a transfer printing device, wherein the transfer printing device includes a plate cylinder and a transfer printing plate disposed on a side wall of the plate cylinder, at least one groove is defined in the transfer printing plate; and coating an alignment liquid on a substrate by using the transfer printing device to form an alignment film with through holes, wherein the through holes correspond to the blind holes.

In some embodiments, the step of preparing the transfer printing device includes:

preparing the transfer printing device; and coating the alignment liquid on the transfer printing plate of the transfer printing device.

In some embodiments, the step of coating an alignment liquid on a substrate by using the transfer printing device to form an alignment film with through hole includes:

rolling the transfer printing device on the substrate to correspond the grooves to the blind holes.

In some embodiments, the step of coating the alignment liquid on the substrate by using the transfer printing device to form the alignment film with the through hole includes:

coating the alignment liquid on the substrate;

pre-curing the alignment liquid to form an alignment layer;

mainly curing the alignment layer to form the alignment film.

In some embodiments, the step of mainly curing the alignment layer to form the alignment film includes:

irradiating the alignment layer with infrared rays to cure the alignment layer.

In some embodiments, at least two grooves are defined in the transfer printing plate.

In some embodiments, the groove is shaped as a circle or a regular polygon.

In a third aspect, an embodiment of the present disclosure provides a display panel. The display panel includes a functional layer and an alignment film Blind holes are defined in the functional layer, and through holes are defined in the alignment film. The blind holes are configured to transmit light, the blind holes correspond to the through holes, and the through holes are manufactured by the manufacturing method of the display panel.

Beneficial Effects

Embodiments of the present disclosure provides a transfer printing device including a plate cylinder and a transfer printing plate disposed on a side wall of the plate cylinder. At least one groove is defined in the transfer printing plate. In embodiments of the present disclosure, because at least one groove is defined in the transfer printing plate of the transfer printing device, during coating of an alignment liquid, the transfer printing plate of the transfer printing device effectively prevents the alignment liquid from being coated in the groove. Therefore, when coating the alignment liquid to a substrate by using the transfer printing plate of the transfer printing device, through holes corresponding to blind holes can be formed in an area corresponding to the groove, thereby preventing blocking effect of an original alignment film on light passing through the blind holes, increasing light transmittance of the blind holes, and improving an overall performance of devices with the blind holes.

DESCRIPTION OF DRAWINGS

Following describes specific implementations of the present disclosure in detail with reference to accompanying drawings, which will make the technical solutions and other beneficial effects of the present disclosure obvious.

DETAILED DESCRIPTION OF EMBODIMENTS

Figure 1:
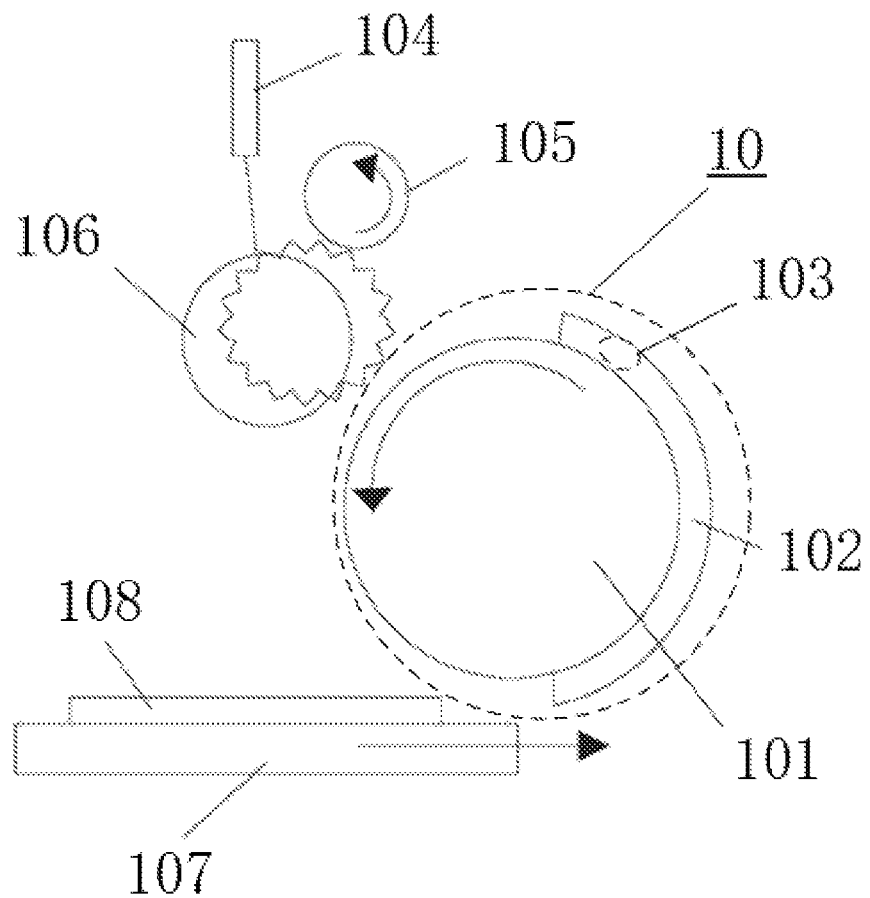
FIG. 1 is a structural schematic view of a transfer printing device according to an embodiment of the present disclosure.

The technical solutions in the embodiments of the present disclosure will be clearly and completely described with reference to the accompanying drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative work fall into protection scope of the present disclosure.

In description of the present disclosure, it needs to be understood that, orientational or positional relationships indicated by terms such as "center", "longitudinal", "transverse", "length", "width", "thickness", "up", "down", "front", "rear", "left", "right", "vertical", "horizontal", "top", "bottom", "inside", "outside", "clockwise", "counterclockwise", etc. are based on orientational or positional relationships shown in the drawings. The terms are only for the convenience of describing the present disclosure and simplifying the description, and does not indicate or imply that devices or elements referred to must have specific orientations, be constructed and operate in specific orientations, and therefore cannot be understood as a limitation on present disclosure. In addition, terms such as "first" and "second" are used herein for purposes of description, and should not be interpreted as indication or implication of relative importance, or implied indication of a number of the technical features. Therefore, features limited by terms such as "first" and "second" can explicitly or impliedly includes one or more than one these features. In description of the disclosure, "a plurality of" means two or more than two, unless otherwise specified.

In description of the present disclosure, it should be noted, the terms "install", "connect", and "couple" shall be understood broadly, unless otherwise explicitly stated and defined, and may be, for example, a fixed connection, a detachable connection, or an integral connection; a mechanical connection or an electrical connection; directly connected or indirectly connected through an intermediate medium; an internal connection of the two elements. The specific meanings of the above terms in the present disclosure can be understood in the specific circumstances for those skilled in the art.

In the present disclosure, unless specifically stated and defined otherwise, that a first feature is "on" or "under" a second feature may include: the first feature and the second feature are not in direct contact but are contacted by another feature between them. Furthermore, that the first feature is "on", "above", or "upon" the second feature includes that the first feature is directly above and obliquely above the second feature, or merely indicates that the first feature is higher in level than the second feature. That the first feature is "under" or "below" the second feature includes that the first feature is directly below and obliquely below the second feature, or merely indicates that the first feature is lower in level than the second feature.

Following disclosure provides various different implementations or examples for implementing different structures of the present disclosure. To simplify the disclosure of the present disclosure, components and settings of specific examples are described below. Of course, they are merely examples and are not intended to limit the present disclosure. In addition, the present disclosure may repeat reference numbers and/or reference letters in different examples, and such repetition is for purpose of simplicity and clarity, and does not indicate relationship between the various embodiments and/or settings discussed. In addition, examples of various specific processes and materials are provided in the present disclosure, but those of ordinary skill in the art may be aware of application of other processes and/or other materials.

Embodiments of the present disclosure provides a display panel, a manufacturing method thereof, and a transfer printing device. Details are described below.

Firstly, the present disclosure provides a transfer printing device. The transfer printing device includes a plate cylinder and a transfer printing plate disposed on a side wall of the plate cylinder. At least one groove is defined in the transfer printing plate.

Figure 2:
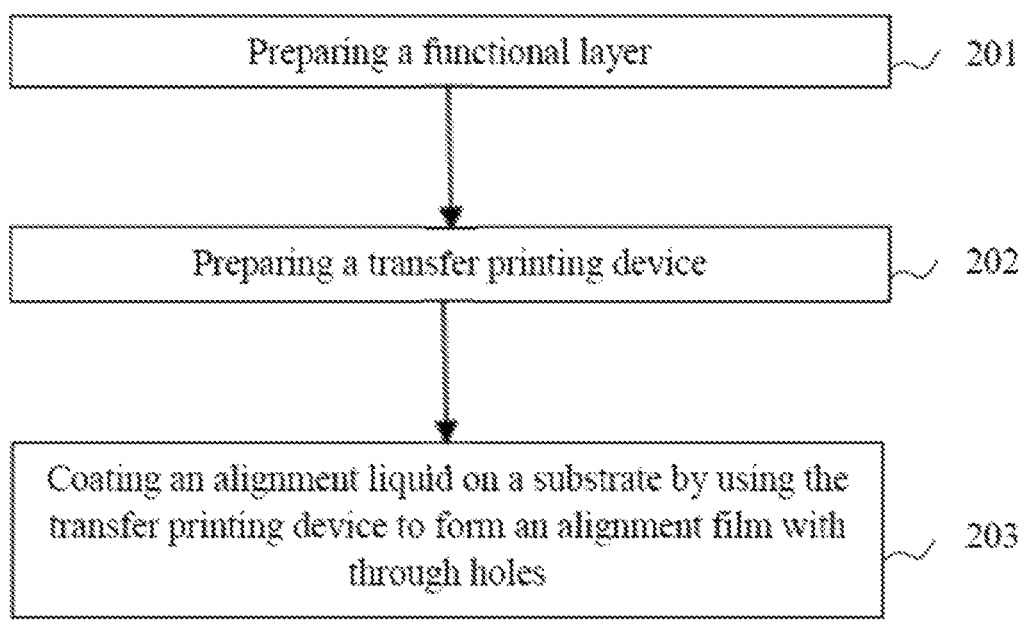
FIG. 2 is a process diagram of a manufacturing method of a display panel according to an embodiment of the present disclosure.

Referring to FIG. 1 and FIG. 2, FIG. 1 a structural schematic view of a transfer printing device according to an embodiment of the present disclosure. Wherein, the transfer printing device 10 includes a plate cylinder 101 and a transfer printing plate 102 disposed on a side wall of the plate cylinder 101. At least one groove 103 is defined in the transfer printing plate.

In this embodiment, the transfer printing device 10 can be used to coat an alignment liquid to a display panel. The transfer printing device 10 uses a relief printing method. As shown in FIG. 1, the transfer printing device 10 may further include an alignment liquid nozzle 104, a doctor roller 105, an anilox roller 106, and a stage 107. Wherein, the alignment liquid nozzle 104 is filled with alignment liquid to be used. Wherein, a printing surface of the transfer printing plate 102 may be provided with a large number of tiny raised dots, and "valley bottoms" between these raised dots can absorb and store the alignment liquid, and transfer the alignment liquid to a substrate. In addition, in order to improve printing uniformity of the transfer printing plate, generally, γ-butyrolactone can be used to soak the transfer printing plate, so as to improve wettability of the transfer printing plate 102 and the alignment liquid, thereby achieving favourable printing uniformity.

In the embodiment of the present disclosure, at least one groove 103 is defined in the transfer printing plate 102 of the transfer printing device 10, so during coating of an alignment liquid, the transfer printing plate 102 of the transfer printing device 10 effectively prevents the alignment liquid from being coated in the groove 103. Therefore, when coating the alignment liquid to a substrate by using the transfer printing plate 102 of the transfer printing device 10, through holes corresponding to blind holes can be formed in an area corresponding to the groove 103, thereby preventing blocking effect of an original alignment film on light passing through the blind holes, increasing light transmittance of the blind holes, and improving an overall performance of devices with the blind holes.

In a specific implementation, as shown in FIG. 1, a substrate 108 is also carried on the stage. During a printing process, the alignment liquid stored in a container with a certain pressure is applied to the anilox roller through the nozzle, and the alignment liquid is evenly coated to the anilox roller through rotation of the doctor roller; then the alignment liquid is uniformly transferred to the transfer printing plate 102 through rotation of the anilox roller; the transfer printing plate 102 is fixed on the plate cylinder 101, and the plate cylinder 101 is rotated to contact a horizontally moving glass substrate, so as to transfer the alignment liquid to the substrate. Wherein, the doctor roller and the anilox roller are in close contact, and there is a certain amount of indentation. Ceramic material can be used for the anilox roller, which is not limited here, and a surface of the anilox roller is covered with hexagonal honeycomb holes at a certain angle.

In some embodiments, in order to pursue a full screen, as functions of the device are diversified, more and more sensing and shooting instruments need to be set under the screen. Therefore, at least two grooves 103 are provided on the transfer printing plate 102, for example, three grooves 103 may be provided, the three grooves 103 correspond to three blind holes required, and the three blind holes may be used for shooting, facial recognition, infrared sensing, etc., and are not limited here.

In some embodiments, the groove 103 is shaped as a circle or a regular polygon. Wherein, the regular polygon may be a regular hexagon or a regular octagon, which is not limited herein.

In order to better implement the transfer printing plate 102 in embodiments of the present disclosure, on the basis of the transfer printing plate 102, the present disclosure also provides a manufacturing method of a display panel, which includes: preparing a functional layer, wherein blind holes are defined in the functional layer; preparing a transfer printing device 10, wherein the transfer printing device 10 is the transfer printing device 10 of the above embodiment; and coating an alignment liquid on a substrate by using the transfer printing device 10 to form an alignment film with through holes, wherein the through holes correspond to the blind holes.

Referring to FIG. 2, it is a process diagram of a manufacturing method of a display panel according to an embodiment of the present disclosure. Wherein, the method includes steps as follows:

201, preparing a functional layer.

Wherein, blind holes are defined in the functional layer.

202, preparing a transfer printing device.

Wherein, the transfer printing device is the transfer printing device of the above embodiment 203, coating an alignment liquid on a substrate by using the transfer printing device to form an alignment film with through holes.

Wherein, the through holes correspond to the blind holes.

In the embodiment, the alignment liquid may be a polyimide material, which is not limited herein.

In the embodiment, generally, the display panel may be a liquid crystal display panel. Wherein, the liquid crystals are a type of liquid crystals, and orientations of liquid crystal molecules naturally dropped into the liquid crystal cell are disordered, which does not meet arrangement requirements of the liquid crystal molecules in design of the liquid crystal cell. Therefore, it is necessary to coat an alignment layer of liquid crystal molecules, that is, an alignment film, on two glass substrates, and then rub directional grooves on the alignment film through a rubbing process. The liquid crystal molecules at this interface are "anchored" by these grooves, so as to be oriented.

It should be noted that, in the above embodiment, the above manufacturing method of a display panel merely describes the above steps. It can be understood that, in addition to the above steps, the manufacturing method of a display panel according to an embodiment of the present disclosure may include any other necessary steps as needed. For example, the method may further include a step of washing the substrate to remove a gray layer on the substrate.

In the embodiment of the present disclosure, at least one groove 103 is defined in the transfer printing plate 102 of the transfer printing device 10, so during coating of an alignment liquid, the transfer printing plate 102 of the transfer printing device 10 effectively prevents the alignment liquid from being coated in the groove 103. Therefore, when coating the alignment liquid to the substrate by using the transfer printing plate 102 of the transfer printing device 10, through holes corresponding to blind holes can be formed in an area corresponding to the groove 103, thereby preventing blocking effect of an original alignment film on light passing through the blind holes, increasing light transmittance of the blind holes, and improving an overall performance of devices with the blind holes.

In some embodiments, the step of preparing a transfer printing plate 102 (pre-amendment: a transfer printing device 10) includes: preparing the transfer printing device 10; and coating the alignment liquid on the transfer printing plate 102 of the transfer printing device 10.

In some embodiments, the step of coating an alignment liquid on a substrate by using the transfer printing device 10 to form an alignment film with through hole includes: rolling the transfer printing device 10 on the substrate to correspond the grooves 103 to the blind holes.

In some embodiments, the step of coating an alignment liquid on a substrate by using the transfer printing device to form an alignment film with through hole includes: coating the alignment liquid on the substrate; pre-curing the alignment liquid to form an alignment layer; mainly curing the alignment layer to form the alignment film.

In the embodiment, since the alignment liquid contains more than 90% solvent, thermally curing is necessary during forming the alignment film to evaporate the solvent by using a high temperature. In addition, since most of the soluble alignment materials used are oligomers or polyamic acids, these oligomers need to undergo a chemical reaction at a high temperature above 220° C. to form an imidized polyimide. Therefore, printed alignment liquid is firstly performed a pre-curing process. Heating methods are divided into two types: hot stage and infrared. The former uses non-contact heating by supporting a glass substrate with a close-up pillar, and uses a hot air bath to evaporate a part of the solvent to form a uniform high-viscosity wet film on a rough surface of the array substrate/color filter substrate. Although the latter infrared method is non-contact heating, a pillar position for supporting is likely to generate thermal aggregation points, thereby causing the alignment solvent to evaporate too quickly, and the surrounding alignment solvent is replenished, thereby resulting in a thicker alignment film at the position of the pillar. Therefore, heat build-up and pillar mura can be prevented by alternately using two sets of movable pillars.

In some embodiments, the step of mainly curing the alignment layer to form the alignment film includes: irradiating the alignment layer with infrared light to cure the alignment layer.

Wherein, most of heating methods used for main curing are infrared methods. Crystal rods or metal rods are used as pillars inside, while hot air is continuously blown to keep a temperature deviation inside a chamber within 3° C., thereby ensuring uniform temperature of a surface of the substrate and making an imidization rate almost uniform. Since the solvent has almost evaporated, even if the pillar causes local overheating, local mura defects will not occur. Main process parameters of the main curing are also temperature and time, and a main reference standard is the imidization rate. Generally, a reaction of polyimide polymer requires a high temperature above 220° C., the longer the time, the higher the conversion rate. It is considered that the target is reached when the conversion rate reaches about 80%. If the time is too long or the temperature is too high, the imidization rate can reach 100%, but a surface of the alignment film is brittle at this time, and debris is likely to be generated in a subsequent friction process, resulting in Zara dust particles.

In order to better implement the manufacturing method of the display panel in the embodiments of the present disclosure, on the basis of the manufacturing method of the display panel, the present disclosure also provides a display panel. The display panel includes a functional layer and an alignment film Blind holes are defined in the functional layer, and through holes are defined in the alignment film. The blind holes are configured to transmit light, the blind holes correspond to the through holes.

In the embodiment, the blind holes may be used to implement a camera under the screen to increase a screen ratio of an electronic product, which may be a mobile phone, a computer, or a TV, which is not limited herein.

It should be noted that the above embodiment merely describes a structure of the above display panel. It can be understood that, in addition to the above structure, the display panel of the embodiment of the present disclosure may also include any other necessary structure as needed, such as a gate insulating layer, an interlayer insulating layer, etc., which are not specifically limited here.

In the embodiment of the present disclosure, at least one groove 103 is defined in the transfer printing plate 102 of the transfer printing device 10, so during coating of an alignment liquid, the transfer printing plate 102 of the transfer printing device 10 effectively prevents the alignment liquid from being coated in the groove 103. Therefore, when coating the alignment liquid to the substrate by using the transfer printing plate 102 of the transfer printing device 10, through holes corresponding to blind holes can be formed in an area corresponding to the groove 103, thereby preventing blocking effect of an original alignment film on light passing through the blind holes, increasing light transmittance of the blind holes, and improving an overall performance of devices with the blind holes.

In some embodiments, the through holes are prepared by the manufacturing method of the display panel in the second aspect.

In some embodiments, the substrate may be an array substrate or a color filter substrate, which is not limited herein.

In this embodiment, the array substrate includes a plurality of thin film transistors distributed in an array. The thin film transistors (TFTs) are one type of field-effect transistors, which are roughly fabricated by depositing various thin films on a substrate, such as semiconductor active layers, dielectric layers, and metal electrode layers. The thin film transistors play a very important role in performance of display devices. The color filter substrate is a color filtering substrate, which is a key component of colorization of the liquid crystal display, and generally includes a glass substrate, a black matrix, red/green/blue primary color resists, a planarization layer, and column spacers.

In the above embodiments, description of each embodiment has its own emphasis. For a part that is not detailed in an embodiment, you can refer to the related description of other embodiments.

The display panel, the manufacturing method of the display panel, and the transfer printing device provided in the embodiments of the present disclosure has been described in detail above. Specific examples are used herein to explain principle and implementation of the present disclosure. The description of the above embodiments is only used to help understand the technical solution of the present disclosure and its core ideas; it will be understood by those of ordinary skill in the art that the technical solutions described in the foregoing embodiments may be modified or equivalently substituted for some or all of the technical features, and the modifications or substitutions do not depart from the scope of the technical solutions of the embodiments of the present disclosure.

What is claimed is:

1. A manufacturing method of a display panel, comprising steps as follows:
   providing a functional layer with a plurality of blind holes, wherein each of the blind holes is surrounded by the functional layer;
   preparing a transfer printing device, wherein the transfer printing device comprises a stage, a plate cylinder, and a transfer printing plate disposed on a side wall of the plate cylinder, wherein the stage is horizontally movable to carry a substrate, and a plurality of grooves are defined in the transfer printing plate, and each of the grooves is surrounded by the transfer printing plate; and
   coating an alignment liquid on the substrate by using the transfer printing device to form an alignment film with through holes formed by the grooves of the transfer printing plate, wherein each of the through holes is surrounded by the alignment film, and the through holes directly overlap the blind holes.

2. The manufacturing method of the display panel in claim 1, wherein the step of preparing the transfer printing device comprises:
   coating the alignment liquid on the transfer printing plate of the transfer printing device.

3. The manufacturing method of the display panel in claim 1, wherein the step of coating the alignment liquid on the substrate by using the transfer printing device to form the alignment film with through holes comprises:
   rolling the transfer printing device on the substrate to correspond the grooves to the blind holes.

4. The manufacturing method of the display panel in claim 1, wherein the step of coating the alignment liquid on the substrate by using the transfer printing device to form the alignment film with through holes comprises:
   coating the alignment liquid on the substrate;
   drying the alignment liquid to form an alignment layer; and
   curing the alignment layer to form the alignment film.

5. The manufacturing method of the display panel in claim 4, wherein the step of curing the alignment layer to form the alignment film comprises:
   irradiating the alignment layer with infrared light to cure the alignment layer.

6. The manufacturing method of the display panel in claim 1, wherein at least two grooves are defined in the transfer printing plate.

7. The manufacturing method of the display panel in claim 1, wherein the groove is shaped as a circle or a regular polygon.

* * * * *